US005235354A

United States Patent [19]

Larson

[11] Patent Number: 5,235,354

[45] Date of Patent: Aug. 10, 1993

[54] METHOD FOR IMPROVING THE PRINTING QUALITY AND REPETITION ACCURACY OF ELECTROGRAPHIC PRINTERS AND A DEVICE FOR ACCOMPLISHING THE METHOD

[75] Inventor: Ove Larson, Västra Frölunda, Sweden

[73] Assignee: Array Printers AB, Sweden

[21] Appl. No.: 781,265

[22] PCT Filed: Jun. 7, 1990

[86] PCT No.: PCT/SE90/00398

§ 371 Date: Dec. 6, 1991

§ 102(e) Date: Dec. 6, 1991

[87] PCT Pub. No.: WO90/14960

PCT Pub. Date: Dec. 13, 1990

[30] Foreign Application Priority Data

Jun. 7, 1989 [SE] Sweden .............................. 8902090

[51] Int. Cl.[5] ............................................ G01D 15/06

[52] U.S. Cl. .................................... 346/154; 346/155

[58] Field of Search .............................. 346/153.1-155

[56] References Cited

U.S. PATENT DOCUMENTS 4,636,816 1/1987 Playe .................................. 346/155

4,755,837 7/1988 Schmidlin et al. .................. 346/155

FOREIGN PATENT DOCUMENTS

WO89/05231 6/1989 Sweden .............................. 346/154

*Primary Examiner*—George H. Miller, Jr.

*Attorney, Agent, or Firm*—Ostrolenk, Faber, Gerb & Soffen

[57] ABSTRACT

Method and device to improve printing quality and the repetition accuracy of electrographical printers, in which are produced a latent electric charge pattern of electrical signals by means of an electrode matrix or the like, which respectively opens and closes passages between electrodes for exposing electric fields for attraction of pigment particles (11) against an information carrier (7). The electrodes (1,2) of the electrode matrix in the area about one or several open passages (3) are screened electrostatically against closed passages, by means of at least two electrically isolated electrodes (1,2).

4 Claims, 2 Drawing Sheets

METHOD FOR IMPROVING THE PRINTING QUALITY AND REPETITION ACCURACY OF ELECTROGRAPHIC PRINTERS AND A DEVICE FOR ACCOMPLISHING THE METHOD

The invention refers to a method and a device to improve the printing quality and the repetition accuracy of electrographical printers, in which are produced a latent electric charge pattern of electrical signals by means of an electrode matrix or the like, which opens and closes passages respectively passages between electrodes for exposing electric fields for attraction of pigment particles against an information carrier.

BACKGROUND OF THE INVENTION

International patent application PCT/ SE88/00653 discloses a method for developing pictures and text with pigment particles on an information carrier, directly from computer generated signals, without the need for these signals to be intermediately stored for temporary conversion to light energy, which is the case in photo conductive printers, e.g. laser printers. These problems have been solved by bringing the information carrier into electrical cooperation with at least a screen or lattice-shaped, preferably an electrode matrix, which through control, in accordance with the configuration of the desired pattern, at least partly opens and closes passages through the matrix which is galvanically connected to a voltage source. An electric field is exposed through the open passages for attraction of the pigment particles against the information carrier.

This method (in the following called the EMS- concept), as it is described in the above patent application, however may result in produced print which does not have high quality, particularly with repeated and continuous use.

The EMS-concept refers to electrode matrices in which passages or meshes through the matrix are defined and separated by simple electrodes, which results in that the potential of every single electrode substantially influences the characteristics of the electric field on the pigment particles symmetrically in passages adjoining the electrodes. This results in the attraction of pigment particles (in the following called toner), not only in the mesh, which is surrounded by electrodes, the potential of which is intended to completely or partly open said mesh (in the following called "black" voltage), but also to expose passages in adjacent meshes. In electrode matrices with several mesh lines, meshes surrounded by simple electrodes will develop full-dots with intended extension and position, as well as half-dots and quarter-dots surrounding the full-dots. This results in an unsatisfactory edge definition and in certain cases as a "blur" on the printed page. It is possible to change the potential of the adjacent electrodes, which are intended to close the passage in the adjacent meshes (in the following called "white" voltage) and hereby reduce the problem with the undesired half- and quarter-dots, by skew setting the above mentioned symmetrical influence on the electrical field. This however leads to a potential difference between electrodes with "white" voltage and electrodes with "black" voltage increases (in the following called contrast voltage), which in turn increases the manufacturing costs for the control electronics, as well as the electrode matrix.

These problems stated above are not limited to the EMS- concept but are also present wholly or partially in several electrographic printer concepts, where passages of toner is created in an electrical manner.

Common to all problems described here, another drawback of the known technique is that the printing quality, and thereby the readability, is influenced in a negative direction resulting in reduced competitiveness and lower consumer value.

THE OBJECT OF THE INVENTION AND MOST IMPORTANT FEATURES

The object of the invention is to create a method which gives the EMS and other electrographic printer concepts, high quality prints with good readability, even when the device operates continuously without maintenance and service. These problems have been solved by the electrodes of the electrode matrix in the area about one or several open passages being electrostatically screened shielded from the closed passages.

DESCRIPTION OF THE DRAWINGS

The invention will be described in greater detail with reference to accompanying drawings in which the embodiments are shown.

DESCRIPTION OF EMBODIMENTS

Figure 1:
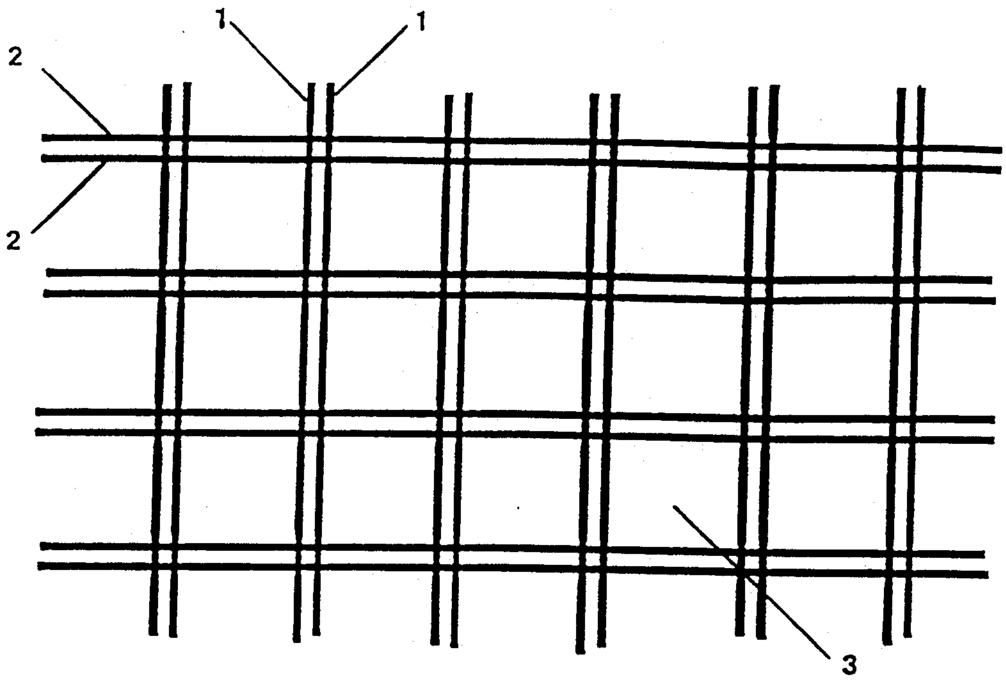
FIG. 1 shows a cross-section of an electrode matrix, the meshes of which are defined with double electrodes.

In the drawings the reference numeral 1 designates an electrode, called a print electrode, the extension of which is substantially parallel to the direction of movement of the paper. A second electrode 2, called a transversal electrode, is located in the same electrode matrix. The electrode 2 extends substantially transverselly to the direction of movement of the paper. Reference numeral 3 designates one of many passages or meshes, between the electrodes 1, 2, through which transport of toner takes place during development. Numeral 7 designates an information carrier, e.g. a sheet of paper, with equipotential lines in an electric field between a developer roller 9, for transport of pigment particles 11 (also called toner) from a container (not shown) in the proximity of the electrode matrix. Numeral 10 designates a background electrode, which can be a so called plate electrode. Numeral 12 designates a carrier for the electrode matrix and/or its pattern of connecting conductors and electric resistors 13 (FIG. 4).

By applying several parallel electrodes 1, 2 with more than one electrode surrounding every mesh, the cross coupling or the crosstalk between two adjacent meshes 3 will be substantially reduced, since every conductor acts like a shield for electrostatic field lines. FIG. 1 shows an electrode matrix with double electrodes 1, 2 extending in both electrode directions.

Figure 2:
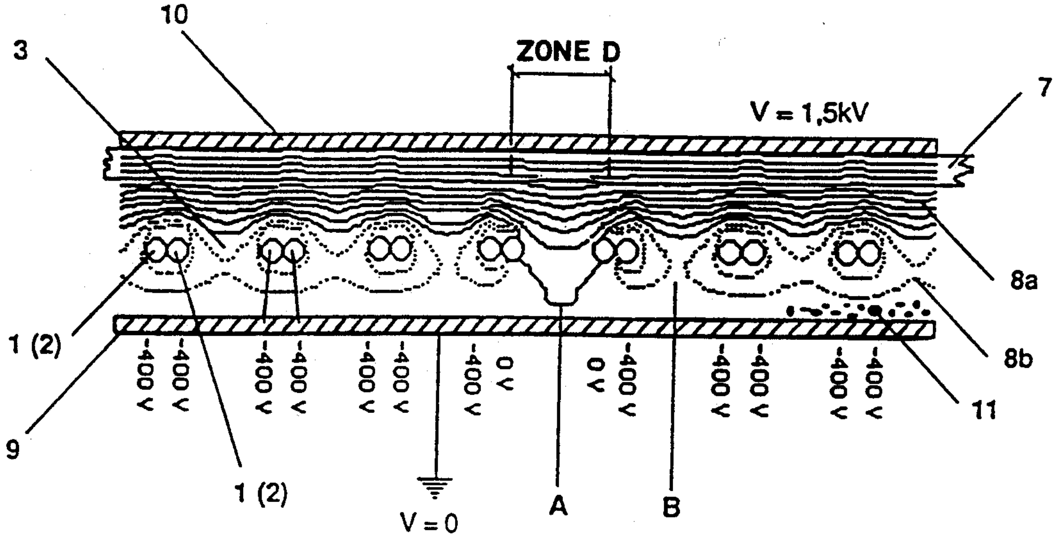
FIG. 2 shows the position and form of the equipotential lines in a two dimensional lateral view of the electrode matrix according to FIG. 1, and the electric field produced by a certain voltage setting of the electrode matrix.

The appearance of the electric field can be illustrated by equipotential lines 8*a*, 8*b*. FIG. 2 gives an example of this, calculated by a numerical method (the finite element method). In FIG. 2 the equipotential lines, which represent a potential, which in relation to the charge of the toner particles have an "attracting" influence on the toner, have been marked with solid lines, 8*a*. Further equipotential lines which represent a potential, which in relation to the charge of the toner particles has a "repelling" influence on the toner, have been marked with dashed lines 8*b*. The toner particles 11, which for the sake of clarity only have been marked in the right part of the picture, in this example, are negatively charged. All electrodes except for two have a "white" voltage of −400 V. Between the two remaining electrodes which have a "black" voltage of 0 V, a dot is intended to be produced in zone D on the paper 7. FIG. 2 shows clearly that the earlier mentioned and undesired cross-talk which is present in single-wired electrode matrices, is no longer troublesome. At A in FIG. 2, where developing is intended to take place, equipotential lines 8*a* penetrate down through the mesh 3 and will thereby increase the field to the extent necessary to lift the toner from developing roller 9. However at B, where no development is intended, the lines 8*a* have been "forced" up in a direction away from the toner particles 11 and "substituted" by "blocking" equipotential lines 8*b*. The appearance and form of the equipotential lines are the same for the process in the mesh to the right of mesh B in FIG. 2.

Figure 3:
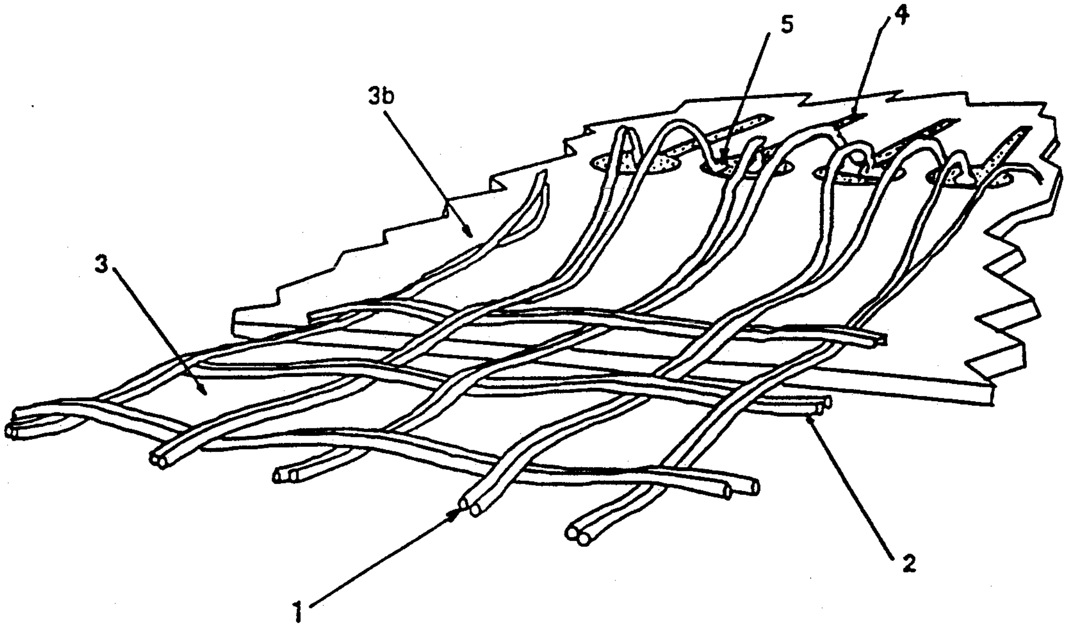
FIG. 3 is a perspective view of a woven net with double electrodes.
Figure 4:
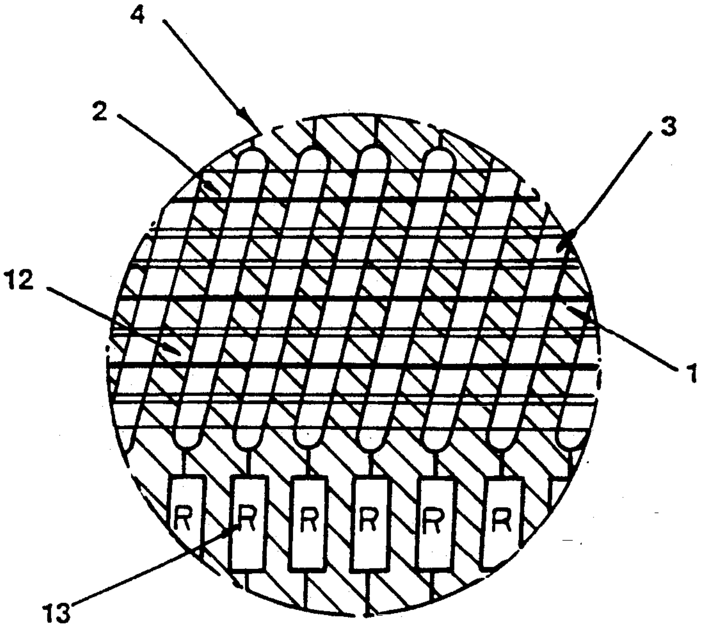
FIG. 4 shows an electrode matrix with double electrodes produced as a conductor pattern on a carrier.

FIGS. 3 and 4 shows examples of devices according to the invention.

FIG. 3 is a perspective view of a woven net of double electrodes 1, 2. Reference numerals 4 and 5 designate a conductive strip and the location at which the electrode is joined to the strip, respectively. In FIG. 4, a carrier 12 for the matrix of electrodes 1, 2 is connected with electrical resistors 13.

The invention is not limited to the above described embodiment. Thus it is possible to apply the invention in other developing and pigment particle systems, e.g. monocomponent toner with carrier. Parts of the invention are also useful when the electrode matrix is placed behind the paper in a way that is described as in PCT/SE88/00653.

I claim:

1. A method of improving printing quality and the repetition accuracy of an electrographical printer in which a latent electrical charge pattern of electrical signals is produced by an electrode matrix, comprising the steps of:

producing the electrical charge pattern by supplying a pattern of electrical signals to electrodes forming the matrix, the electrical charge pattern controlling the transmission of electrical fields through passages between the electrodes of the matrix for attracting pigment particles of a toner against an information carrier, wherein the electrode matrix is formed by a plurality of pairs of adjacent double electrodes arranged in a lattice-shaped pattern, each of the adjacent double electrodes being individually connected to a voltage source supplying the electrical signals; and electrically shielding closed passages in the matrix from adjacent open passages in the matrix by connecting at least one of the electrodes of each double adjacent electrode to a first voltage to produce an open passage, while an adjacent electrode of each double adjacent electrode is connected to a second voltage to produce a closed passage.

2. A device for improving the printing quality and repetition accuracy of electrographical printers, in which a latent electrode charge pattern of electrical signals is produced by an electrode matrix for controlling the transmission of electrical fields through passages between the electrodes of the matrix for attracting pigment particles of a toner against an information carrier, wherein:

the electrode matrix is formed by a plurality of adjacent double electrodes arranged in a lattice-shaped pattern, each of the adjacent double electrodes being individually connected to a voltage source supplying the electrical signals; and closed passages in the matrix are electrically shielded from adjacent open passages in the matrix by connecting at least one of the electrodes of each double adjacent electrode to a first voltage to produce an open passage, while an adjacent electrode of each double adjacent electrode is connected to a second voltage to produce a closed passage.

3. The device of claim 2, further comprising means for connecting the passages, separated by the adjacent double electrodes, to the same or different voltages.

4. The device of claim 2, wherein the electrodes situated opposite each other across each passage are coupled together and connected to the same voltage source.

* * * * *